UNITED STATES PATENT OFFICE.

JAMES A. RYAN, OF RUFFS DALE, PENNSYLVANIA, ASSIGNOR OF ONE-THIRD TO FRED L. KECK AND ONE-THIRD TO D. P. RYAN, OF RUFFS DALE, PENNSYLVANIA.

ANTICORROSIVE COMPOSITION.

No. 841,573.     Specification of Letters Patent.     Patented Jan. 15, 1907.

Application filed August 15, 1906. Serial No. 330,753.

*To all whom it may concern:*

Be it known that I, JAMES A. RYAN, a citizen of the United States, residing at Ruffs Dale, in the county of Westmoreland and State of Pennsylvania, have invented new and useful Improvements in Anticorrosive Compositions, of which the following is a specification.

The invention relates to a process for making a composition designed primarily for application to metal and serving when applied to protect the material against corrosion from any source.

In producing the composition of the present invention I use copperas, gum-asphaltum, ivory-black, drier, varnish, (preferably a good oil varnish, such as used by painters for outside work,) linseed-oil, turpentine, litharge, glue, sulfate of zinc, gum-shellac, and dark gum-amber. As a result of a mixture of these ingredients a paint-like composition is produced, which is designed to be applied directly to the articles to be protected in a manner similar to the application of paint.

In the preferred proportions and manner of forming the composition the ingredients are used in the following manner: Twenty-four ounces of gum-asphaltum in pulverized condition is melted in a suitable receptacle, to which is slowly added in succession eight ounces of linseed-oil, twenty-four onces of finely-ground ivory-black, one ounce of litharge, one ounce of sulfate of zinc, and two ounces of copperas. The mixture is allowed to boil for about three hours and the dark gum-amber added, about two ounces of the latter being used. The mixture is further boiled for about two hours and allowed to partially cool, whereupon one ounce of the gum-shellac and thirty-two ounces of the varnish are added during continuous agitation of the mass. One ounce of glue is then added and the mixture heated for about thirty minutes. After cooling drier and turpentine in the proportions of about twenty-four ounces of the dryer and eight ounces of the turpentine are added to reduce the consistency of the mass to permit its proper application.

The composition made up in the manner and approximately in the proportion stated is to be applied to any metallic surface and will be found to have rendered said surface non-corrosive as well as antifouling and acid-proof. The mixture is applied in the manner usual in the application of paint, being of a consistency permitting such application in a ready and convenient manner.

The composition is primarily designed for exposed metallic surfaces, being particularly effective with machinery of all character, roof structures, metal fences, and the like.

While preferring to make up the composition in the manner and in the proportions above stated, it is to be understood that I do not specifically limit myself thereto, as slight variations will not seriously interfere with the efficiency of the composition and are to be considered within the scope of the present invention. This is particularly true of the specific ingredients named, as the chemical equivalents thereof, if such exist, will prove equally effective.

Having thus described the invention, what is claimed as new is—

1. An anticorrosive composition comprising copperas, gum-asphaltum, ivory-black, litharge, sulfate of zinc, a binding agent, and a liquid vehicle.

2. An anticorrosive composition comprising pulverized gum-asphaltum, linseed-oil, ground ivory-black, litharge, sulfate of zinc, copperas, dark gum-amber, gum-shellac, varnish, glue, drier, and turpentine.

3. An anticorrosive composition comprising pulverized gum-asphaltum twenty-four ounces, linseed-oil eight ounces, ground ivory-black twenty-four ounces, litharge one ounce, sulfate of zinc one ounce, copperas two ounces, dark gum-amber two ounces, gum-shellac one ounce, varnish thirty-two ounces, glue one ounce, drier twenty-four ounces, and turpentine eight ounces.

4. The herein-described process for producing a non-corrosive composition consisting in melting pulverized gum-asphaltum, to which is added linseed-oil, finely-ground ivory-black, litharge and sulfate of zinc in the order stated, boiling the mixture a determinate length of time, adding thereto the dark gum-amber, subjecting the mixture to further boiling and a partial cooling, adding gum-shellac and varnish during a continuous agitation of the mixture, adding glue, further heating the mixture and allowing it to cool, and finally adding drier and turpentine.

In testimony whereof I affix my signature in presence of two witnesses.

JAMES A. RYAN.

Witnesses:
C. C. WASHABAUGH,
J. S. DIBLER.